United States Patent
Wu et al.

(10) Patent No.: US 11,132,124 B2
(45) Date of Patent: Sep. 28, 2021

(54) MEMORY SUBSYSTEM OPERATIONS WITH UNALIGNED AND SCATTER GATHER FEATURE TO SUPPORT CONVOLUTION AND DIMENSION SHUFFLE

(71) Applicant: Intel Corporation, Santa Clara, CA (US)

(72) Inventors: Olivia Wu, Los Altos, CA (US); Prashant Arora, Fremont, CA (US); Jason Ko, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 536 days.

(21) Appl. No.: 16/006,752

(22) Filed: Jun. 12, 2018

(65) Prior Publication Data
US 2019/0042092 A1 Feb. 7, 2019

(51) Int. Cl.
*G06F 17/16* (2006.01)
*G06F 3/06* (2006.01)
*G06N 3/08* (2006.01)
*G06N 3/063* (2006.01)
*G06N 3/04* (2006.01)
*G06T 1/60* (2006.01)

(52) U.S. Cl.
CPC ............ *G06F 3/0604* (2013.01); *G06F 3/064* (2013.01); *G06F 3/0673* (2013.01); *G06N 3/0454* (2013.01); *G06N 3/063* (2013.01); *G06N 3/08* (2013.01); *G06T 1/60* (2013.01)

(58) Field of Classification Search
CPC ...................................................... G06F 17/16
USPC ......................................................... 711/165
See application file for complete search history.

(56) References Cited

U.S. PATENT DOCUMENTS

| | | | | |
|---|---|---|---|---|
| 10,453,570 | B1* | 10/2019 | Podilchuk | G16H 30/20 |
| 10,489,479 | B1* | 11/2019 | Shalev | G06F 17/12 |
| 2005/0273589 | A1* | 12/2005 | Gong | G06F 12/0638 713/2 |
| 2015/0227316 | A1* | 8/2015 | Warfield | G06F 3/065 711/103 |
| 2016/0147460 | A1* | 5/2016 | Sohn | G06F 12/00 711/165 |
| 2016/0162402 | A1* | 6/2016 | Woolley, Jr. | G06K 9/00288 711/202 |
| 2018/0268548 | A1* | 9/2018 | Lin | G06N 3/084 |
| 2018/0307614 | A1* | 10/2018 | Luo | G06F 12/0292 |
| 2019/0318225 | A1* | 10/2019 | Heinecke | G06N 3/0445 |
| 2019/0392287 | A1* | 12/2019 | Ovsiannikov | G06N 3/063 |

* cited by examiner

*Primary Examiner* — Min Huang
(74) *Attorney, Agent, or Firm* — Trop Pruner & Hu, P.C.

(57) ABSTRACT

One embodiment provides an apparatus. The apparatus may include memory circuitry to store tensor data representing a tensor. The apparatus may include memory controller circuitry to access the memory circuitry. The apparatus may include processor circuitry to: receive a request for a tensor operation; generate a plurality of sub-commands for the tensor operation; and provide the sub-commands to memory controller circuitry to perform the tensor operation based on instructions contained in one or more of the sub-commands. The instructions contained in one or more of the sub-commands may include identify addresses in memory to access; activate one or more rows in the memory circuitry that correspond to the addresses; and transfer tensor data to and/or from the memory circuitry.

22 Claims, 10 Drawing Sheets

MEMORY SUBSYSTEM OPERATIONS WITH UNALIGNED AND SCATTER GATHER FEATURE TO SUPPORT CONVOLUTION AND DIMENSION SHUFFLE

FIELD

The present disclosure relates to memory subsystem operations to support machine learning computations.

BACKGROUND

Machine learning operations in a computing system involves many compute-intensive operations, including matrix multiplication of tensors (e.g., data matrices) and convolution. Graphical processing units (GPUs) are more well-suited to these operations than central processing units (CPUs) since GPUs were originally designed for video games, in which the movement of on-screen objects is governed by vectors and linear algebra. As a result, GPUs have become the go-to computing platform for computationally intensive machine learning. However, when performing complex and extensive machine learning operations, GPUs leave much room for improvement, at least because the numeric precision, control logic, caches, and other architectural elements of GPUs were optimized for video games, not machine learning. More specifically, GPUs and other processors do not support unaligned, scatter, and gather copy operations.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
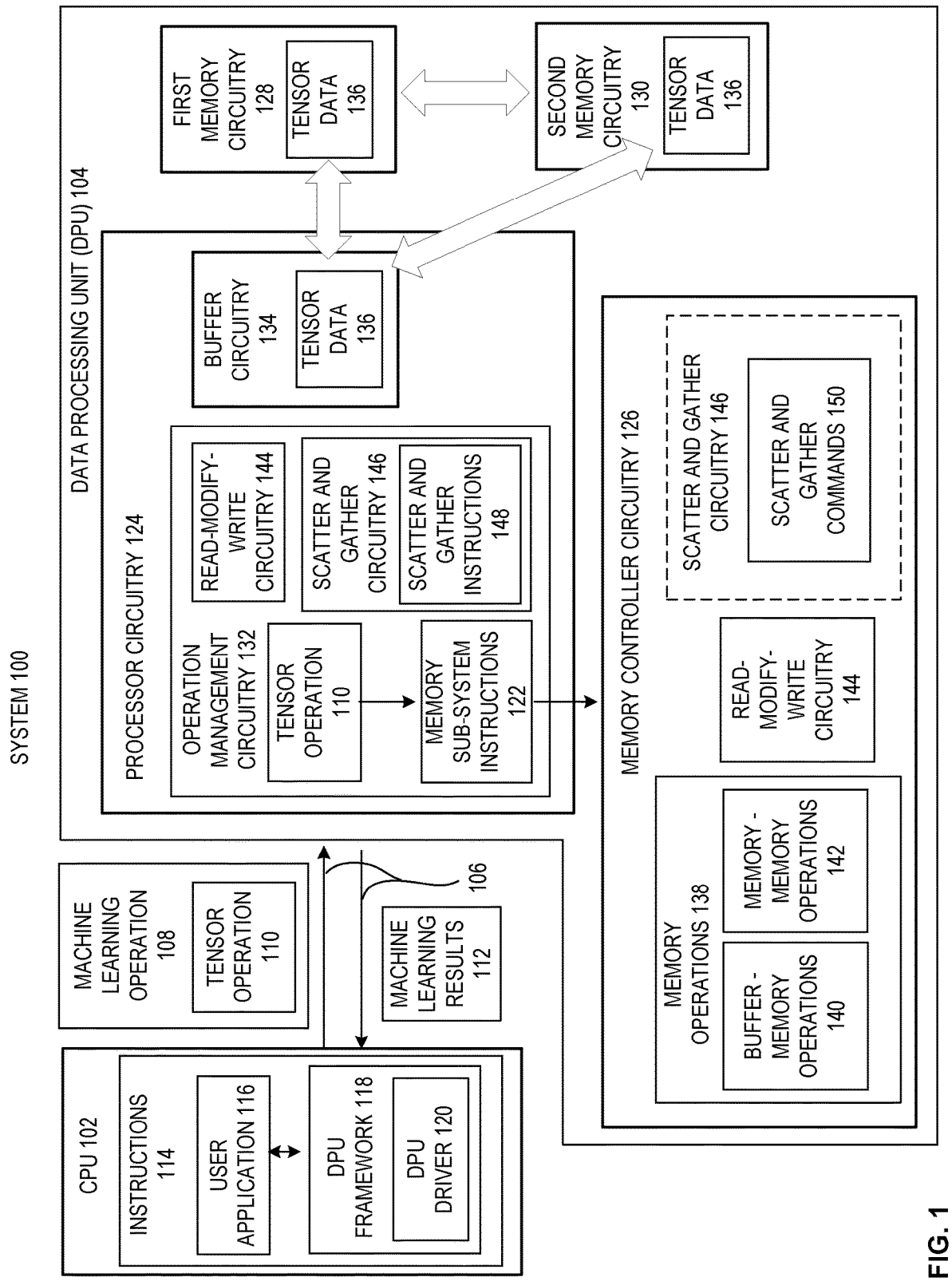
FIG. 1 is an example functional block diagram of a computing system for reducing latency in tensor operations and for enabling tensor operations, consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

Disclosed herein is a data processing unit that improves machine learning processing capabilities by reducing the latency associated with tensor operations through converting a high-level tensor operation into a number of memory sub-system commands within the data processing unit, consistent with several embodiments of the present disclosure. The memory sub-system commands are executed within the data processing unit to reduce the quantity of externally received memory instructions. The circuitry of the data processing unit and the operations of the data processing unit decrease the latency of existing tensor operations, and enable the data processing unit to perform additional tensor operations that were unavailable or not conveniently achievable by existing processor architectures (e.g., graphical processing units (GPUs)) used for machine learning. The disclosed data processing unit may be referred to as a tensor processing unit (TPU) or a neural network processor (NNP) and generally may be used to perform machine learning operations. The data processing unit may, in at least some embodiments, be employed as an accelerator to perform machine learning operations in conjunction with a CPU, GPU, or other processor.

The disclosed data processing unit enables unaligned copy operations, scatter copy operations, and gather copy operations, consistent with embodiments of the present disclosure. By performing unaligned, scatter, and gather copy operations, the disclosed data processing unit, decreases latency between operations, increases the speed by which operations may be performed, and enables utilization of a network of similar data processing units to perform tensor operations, according to various embodiments.

As used herein, the term "tensor" refers to a single dimensional or multi-dimensional data structure that may be used to perform one or more machine learning operations. The term "tensor" may also refer to a mathematical object analogous to but more general than a vector, represented by an array of components that are functions of the coordinates of a space.

As used herein, the term "slice" is used interchangeably with the term "stripe" and refers to a matrix subset of a tensor, and is typically along a subset of the dimensions of a defined tensor. For example, for a 3D tensor, a slice may be any 1D or 2D subset of the 3D tensor.

As used herein, the term "stride" refers to contiguous data locations in a tensor or data matrix. A data stride may refer to columns or rows of data that are separated by one or more gaps of columns or rows of less relevant or undesired data for a particular operation.

As used herein, the term "dimensional shuffle" is interchangeable with the term "dimshuffle" and refers to a virtual re-orientation of multi-dimensional tensor or array data.

As used herein, the term "convolution" refers to a function derived from two given functions by integration that expresses how the shape of one function is modified by the other.

FIG. 1 depicts an example diagram of a system 100 for reducing latency and for enabling unaligned copy, scatter copy, and gather copy tensor operations, consistent with embodiments of the present disclosure. The computing system includes a central processing unit (CPU) 102 coupled to a data processing unit (DPU) 104 through one or more channels 106, according to an embodiment. The CPU 102 transmits a machine learning operation 108 that includes a tensor operation 110 to the data processing unit 104. The CPU 102 receives machine learning results 112 from the data processing unit 104 over the one or more channels 106, in response to the data processing unit 104 performing the machine learning operation 108 and/or the tensor operation 110, according to an embodiment.

The CPU 102 may be configured to transmit the tensor operation 110 to the data processing unit 104, in response to executing a variety of instructions 114, according to one embodiment. For example, the instructions 114 may include a user application 116, a DPU framework 118, and/or a DPU driver 120, according to various embodiments. The user application 116 may include a program (e.g., advertisement selection software, marketing software, educational software, financial services software, a virtual reality program, a programming interactive development environment (such as Python or R), video rendering software, etc.) that uses tensors or other or data structures to perform functions for a user, or to provide services to the user. The DPU framework 118 may include an application programming interface (API) or sets of instructions that translate requests from the user application 116 into the machine learning operation 108 and/or the tensor operation 110, according to one embodiment. The DPU framework 118 may be configured to reverse the process and translate machine learning results 112 into a format that is usable by the user application 116, according to one embodiment. The DPU framework 118 may include the DPU driver 120, which may be directly inaccessible to the user application 116. The DPU driver 120 may be used to translate abstract or application-specific operations or commands into a format that is accepted by the data processing unit 104. In one embodiment, the DPU framework 118 and/or the DPU driver 120 enable the data processing unit 104 be interchangeably inserted into the system 100 to replace a graphical processing unit (GPU) or an existing tensor processing unit (TPU), according to one embodiment.

The data processing unit 104 is configured to reduce latency in tensor operations by receiving the tensor operation 110 and translating the tensor operation 110 into a number of memory sub-system instructions that would otherwise be transmitted over the one or more channels 106 from the CPU 102, according to an embodiment. Illustrative examples of the tensor operation 110 include copying data from buffer circuitry to memory circuitry, copying data from memory circuitry to buffer circuitry, copying data between locations within memory circuitry, and the like. Traditional implementations of machine learning systems used a CPU to transmit commands to access various source memory locations, read the memory locations, address the destination locations, write the memory locations, and confirm the successful transfer of information. To transmit such information from a CPU to another processor (such as a GPU) consumed data bus bandwidth, and injected operations latency into the data/memory operations. By contrast, the present disclosure simplifies the content of the tensor operation 110 and provides hardware support within the data processing unit 104 to manage the details of tensor operations within the data processing unit 104. This technique provides several advantages over the existing techniques. Some of the advantages include, less bandwidth consumption of the CPU, less latency between one memory access command and another, and expanded ability to address memory locations in unconventional addresses (e.g., access that are unaligned with logical structures within memory circuitry or buffer circuitry), according to various embodiments.

The data processing unit 104 is also configured to perform tensor operations that improve the speed by which complex tensor operations may be performed, according to an embodiment. That is, the data processing unit 104 is configured to perform unaligned copy operations, scatter copy operations, and gather copy operations. These operations improve the overall performance capability of data processing units to perform complex tensor operations such as convolution and dimension shuffle operations.

The data processing unit 104 includes a number of components to perform the tensor operation 110, according to an embodiment. The data processing unit 104 includes processor circuitry 124, memory controller circuitry 126, first memory circuitry 128, and second memory circuitry 130, according to an embodiment.

The processor circuitry 124 receives the tensor operation 110 and delegates the memory operations associated with the tensor operation 110 to various memory sub-systems. The processor circuitry 124 includes operation management circuitry 132 and buffer circuitry 134. The operation management circuitry 132 receives the tensor operation 110 and converts or translates the tensor operation 110 into one or more memory sub-system instructions 122, according to an embodiment. The one or more memory sub-system instructions 122 direct the memory controller circuitry 126 to perform transfers of the tensor data 136 within the data processing unit 104, according to an embodiment. The buffer circuitry 134 temporarily stores the tensor data 136 (or portions of the tensor data 136) while the processor circuitry 124 performs operations (e.g., matrix multiplication) on the data stored in the buffer circuitry 134, according to an embodiment.

In response to the memory sub-system instructions 122, the memory controller circuitry 126 performs a number of memory operations 138. The memory operations 138 may include buffer-memory operations 140 and memory-memory operations 142, according to one embodiment. The buffer-memory operations 140 include data copy or data transfer operations between the buffer circuitry 134 and first and/or second memory circuitry 128, 130. The buffer-memory operations 140 may include, for example, copying data from the buffer circuitry 134 to the first memory circuitry 128, copying data from the buffer circuitry 134 to the second memory circuitry 130, copying data from the first memory circuitry 128 to the buffer circuitry 134, and/or copying data from the second memory circuitry 130 to the buffer circuitry 134, according to various embodiments. The memory-memory operations 142 include data copy or data transfer operations between the first memory circuitry 128 and the second memory circuitry 130. The memory-memory operations 142 may include, for example, copying data from the first memory circuitry 128 to the second memory circuitry 130 and/or copying data from the second memory circuitry 130 to the first memory circuitry 128.

To enable unaligned copy operations, the data processing unit 104 includes read-modify-write circuitry 144, according to an embodiment. The read-modify-write circuitry 144 may be manufactured within the processor circuitry 124 (e.g., within the operation management circuitry 132), may be manufactured within the memory controller circuitry 126, or may be partially manufactured in both the processor circuitry 124 and the memory controller circuitry 126, according to various embodiments.

The data processing unit 104 uses the read-modify-write circuitry 144 to perform unaligned copy operations, according to an embodiment. In an aligned copy operation, the data processing unit 104 activates and reads an entire row (or page) of a source matrix element (e.g., matrix element 206 shown in FIG. 2A) of memory circuitry. A matrix element is a subset of memory circuitry that may be a hardware-based subset or a software-based subset of memory circuitry and that may represent one or more physical memory pages, rows, or units of memory circuitry or buffer circuitry, according to an embodiment. In the aligned copy operation, the data processing unit 104 then activates and writes an entire row (or page) of a destination matrix element (e.g., matrix element 216 shown in FIG. 2A). Reading and writing entire rows of matrix elements requires less data management overhead and is a typical memory procedure. However, in tensor operations, a read or write of a partial matrix element (or portion of a group of matrix elements) enable convolution, dimension shuffle, and other tensor operations to be performed more efficiently, faster, and in a manner that is more well-suited for how tensor algorithms operate.

The read-modify-write circuitry 144 enables unaligned copy operations, according to an embodiment. The read-modify-write circuitry 144 activates and reads an entire row of a source matrix element and identifies the portion of the row that is to be written to a destination matrix element. The read-modify-write circuitry 144 activates the entire row of the destination matrix and copies the entire row into a buffer or other temporary storage location. The read-modify-write circuitry 144 modifies the portion of the buffer that is to be written over and then writes the entire row (now modified) back to the entire row of the destination matrix.

Describing the unaligned copy operation another way, the read-modify-write circuitry 144 performs three basic sub-operations. First, the read-modify-write circuitry 144 accesses the existing content of the line of aligned memory/buffer to be read out. Second, the read-modify-write circuitry 144 merges the aligned memory/buffer with unaligned data that is to be updated, while maintaining the remainder of the existing content in an unchanged state. Third, the read-modify-write circuitry 144 writes the merged new content with the existing content back into the memory.

In one embodiment, the data processing unit 104 uses both the operation management circuitry 132 and the memory controller circuitry 126 to perform unaligned copy operations. The operation management circuitry 132 may be configured to partition memory circuitry into aligned data and unaligned data by mapping or otherwise tracking the boundary between the aligned data and unaligned data within a matrix element (e.g., the matrix element 216 shown in FIG. 2B). In an embodiment, the operation management circuitry partitions an unaligned access (read or write) operation into 2 KB blocks of data that are mapped or otherwise identified as aligned and unaligned. The memory controller circuitry 126 may be configured to execute the (read and write) accesses of the source and destination matrix elements, based on the partitions or mappings of aligned and unaligned data provided by the operation management circuitry 132, according to an embodiment. The memory controller circuitry 126 includes buffers and/or access to temporary memory locations that are used to read, modify, and write destination matrix elements, to complete unaligned copy operations, according to an embodiment. Advantages of using the memory controller circuitry 126 to handle execution of the read, modify, and write operations include, but are not limited to, improved efficiency of scheduling clusters/groups of read-modify-write operations between the memory circuitry and the memory controller circuitry 126, and reduced power consumption and reduced bandwidth required to transfer data between the memory circuitry and the processor circuitry 124 (which may represent a plurality of processor cores or processor clusters), according to an embodiment.

To enable scatter and gather copy operations, the data processing unit 104 includes scatter and gather circuitry 146, according to an embodiment. The scatter and gather circuitry 146 may be included within the processor circuitry 124 (e.g., within the operation management circuitry 132), may be included within the memory controller circuitry 126, or may be partially included in both the processor circuitry 124 and the memory controller circuitry 126, according to various embodiments.

When included in the processor circuitry 124, the scatter and gather circuitry 146 may be configured to complete a scatter and gather instructions 148, according to an embodiment. The scatter and gather instructions 148 may be defined to support address striding on a per instruction basis. To complete scatter instructions, the scatter and gather circuitry 146 may first partially interpret/execute (or "unroll") the scatter instructions to determine how the strides of data are to be distributed across the multiple memory channels. The scatter and gather circuitry 146 may determine individual memory address locations for writing the data to, based on stride characteristics (e.g., inclusive of the stride size and data elements within the stride). The scatter and gather circuitry 146 may then distribute the data into individual memory address locations based on the stride specification.

To complete gather instructions, the scatter and gather circuitry 146 may first partially interpret/execute the gather instructions to determine how the strides of data are distributed across the multiple memory channels. The scatter and gather circuitry 146 may then identify a block of memory address locations to write the data to. The scatter and gather circuitry 146 may then distribute the data into the memory address locations that are contiguous to store the copied data into, for example, a single stride.

The scatter and gather circuitry 146 may be distributed between the processor circuitry 124 and the memory controller circuitry 126, according to an embodiment. The scatter and gather circuitry 146 within the processor circuitry 124 may be configured to partially unroll the command to determine how the strides are (or are to be) distributed across the multiple memory channels, and the scatter and gather circuitry 146 within the processor circuitry 124 may be configured to distribute to the memory controller circuitry 126 portions of the command (e.g., scatter and gather commands 150) that are mapped to memory of a particular channel. For example, if there is a burst of 16 writes that are to be scattered across 2 memory channels (assuming 8 are going to the $1^{st}$ channel, and the other 8 are going to the $2^{nd}$ channel), then 8 writes will be sent to the $1^{st}$ channel, and the other 8 writes will be sent to the $2^{nd}$ channel.

The scatter and gather circuitry 146 within the memory controller circuitry 126 may be configured to further scatter the data into individual address location based on the stride specification. The memory controller circuitry 126 may represent several memory controllers, with each memory controller configured to manage memory accesses of a particular channel (e.g., 8 memory controllers for 8 channels).

The scatter and gather circuitry 146 of the processor circuitry 126 may be used to bypass some of the memory controller circuitry 126 functionality. In an embodiment, the data processing unit 104 uses the scatter and gather circuitry 146 of the processor circuitry 126 to perform scatter/gather operations if 1) data are striped across memory channels; and 2) a stride will result in data spread evenly across the memory channels, (i.e. stride is a multiple of the number of striped channels). For a scatter command using the scatter and gather circuitry 146 of the processor circuitry 126, the processor circuitry 124 will accumulate/gather data from the buffer circuitry 134 based on "original stride size * the number of striped channels", and send the data to the appropriate memory channels with a scatter command (copy with stride) with the new stride size set to "original stride size/number of striped channels".

Aligned verses unaligned operations, and scatter and gather operations are described further below and are illustrated in FIGS. 2A and 2B, 3-4, 5A and 5B, and 6, according to various embodiments.

By transitioning the detailed memory instructions/operations internally to the data processing unit 104, the unaligned copy, scatter copy, gather copy and other tensor operations (e.g., copy operations) may be enabled and/or may be performed faster, with less potential noise or other external interference, utilizing less power (lost through CPU 102 transmissions to the data processing unit 104), and with a reduced software footprint. Enabling internal memory controller circuitry to manage data operations and schedule burst accesses to the memory circuitry 128, 130, may result in memory page hit rates achieving over 87%.

Examples of the tensor operation 110 that may be provided to and/or executed by the data processing unit 104 are provided below in Table 1 and Table 2.

TABLE 1

Memory Instruction Overview

| COPY | Memory Circuitry to Buffer Circuitry Data Movement | Used to copy a handle from Memory Circuitry to Buffer Circuitry and vice-versa. The handle is split into max block/burst access unit that is supported by memory controller in a single access (e.g., 32 × 32 byte blocks). Operand alignment is described in Table 2: COPY and HBM_COPY Fields Summary |
| --- | --- | --- |
| HBM_COPY | Memory Circuitry Data Movement | Used to copy a handle from Memory Circuitry to a different Memory Circuitry location. The handle is split into max block/burst access unit that is supported by memory controller in a single access (e.g., 32 × 32 byte blocks), by Operation Management Circuitry and the copy proceeds in block row order. This support data movement within the same Memory Circuitry channel, between 2 different Memory Circuitry channels on the same chip, and between 2 different Memory Circuitry channels across 2 different data processing units. Operand alignment is described in Table 2: COPY and HBM_COPY Fields Summary |
| COPY_CONV | Buffer Circuitry to Memory Circuitry Data Movement | Copies a source Buffer Circuitry operand handle to an existing Memory Circuitry destination handle using convolutional read. The source handle is read starting at conv_offset and reads non-consecutive Buffer Circuitry locations, with a stride conv_stride. A transpose flag can be used for COPY_CONV instructions. The Buffer Circuitry handle A and Memory Circuitry handle W have the same dimensions. Each handle may be restricted to be <= max block/burst access unit that is supported by memory controller in a single access (e.g., 32 × 32 byte blocks) in dimension. The Buffer Circuitry handle A is read from Buffer Circuitry in convolutional mode, i.e., starting at offset conv_offset from the base handle and using conv_stride. For dependency checking, the source handle A is expanded to span the entire strided range. The unit of conv_offset and conv_stride is Buffer Circuitry rows. |

TABLE 2

COPY and HBM_COPY Fields Summary

| Field | Notes |
|---|---|
| addr | Partially setting addr == 0xFF may indicate an Buffer Circuitry handle (e.g., a pointer to Buffer Circuitry).<br>Memory Circuitry address (e.g., a pointer to Memory Circuitry) range may be 35 bits of addr.<br><br>Address Map<br><br>| Range | | |<br>|---|---|---|<br>| 0x00_0000_0000 | 0x07_FFFF_FFFF | HBM |<br>| 0xFF_0000_0000 | 0xFF_FFFF_FFFF | MRB |<br><br>Buffer Circuitry Address Map<br><br>| Range | | |<br>|---|---|---|<br>| 0xFF_0000_0000 | 0xFF_00FF_FFFF | MRB0 |<br>| 0xFF_0100_0000 | 0xFF_01FF_FFFF | MRB1 |<br>| 0xFF_0200_0000 | 0xFF_02FF_FFFF | MRB2 |<br>| 0xFF_0300_0000 | 0xFF_03FF_FFFF | MRB3 |<br>| 0xFF_0400_0000 | 0xFF_04FF_FFFF | MRB4 |<br>| ... | ... | ... |<br>| ... | ... | ... | |
| iid | This is a SW assigned instruction ID that refers to the instruction for debug, setting breakpoints and MPU statistics collection. If iid is set, MPU stats are not collected for the instruction. |
| sizex | Specifies the total x size (columns) of a handle. The unit is a flex element (e.g., 4B for FP32 system, 2B for FP16 or BFloat16 system).<br>This size determines the layout of the handle. The handle is divided into max block/burst access unit that is supported by memory controller in a single access (e.g., 32 × 32 byte blocks) and these blocks are laid out consecutively row-wise. The address range of a slice inside the handle will be determined by this initial layout of the original handle. |
| sizey | Specifies the total y size (rows) of a handle. The unit is a flex element (e.g., 4B for FP32 system, 2B for FP16 or BFloat16 system). |
| x<br>dx | x coordinate (column) of the origin of a slice within a handle, in units of flex elements (e.g., 4B for FP32 system, 2B for FP16 or BFloat16 system). dx is the width of the slice in the x direction (column).<br>If a coordinate (x or y) is a multiple of the size of the max block/burst access unit (e.g., 32 bytes) it is considered aligned, else unaligned.<br>The x coordinate can be unaligned for Memory Circuitry accesses. However, unaligned writes to Memory Circuitry require a read-modify-write and are inefficient.<br>The x coordinate must be aligned for Buffer Circuitry writes as Buffer Circuitry don't support byte-enables.<br>There are some additional restrictions on operand alignment when doing unaligned COPY instructions as noted per instruction type. |
| y<br>dy | y coordinate (row) of the origin of a slice within a handle, in units of flex elements (e.g., 4B for FP32 system, 2B for FP16 or BFloat16 system). dy is the width of the slice in the y direction (row).<br>The y offset and dy can be any value for Memory Circuitry accesses in general.<br>The y offset and dy are restricted to be multiples of 2 for Buffer Circuitry access. This is because Buffer Circuitry write two rows at a time, so starting on an odd address will cause the companion row to get overwritten.<br>There are some exceptions on operand alignment when doing unaligned COPY type instructions as noted per instruction type.<br>Note: Buffer Circuitry handle addresses can be aligned on a 64 byte aligned address, i.e., handles can be created starting on any Buffer Circuitry row address. The y offset is then computed based on this base address. |
| wc | Wall context. Each instruction is assigned a wall-context. The completion status of instructions is tracked per wall-context and per client. |
| wc_map | 1-hot field specifying one or more wall-contexts. A WALL instruction blocks all following instructions from the client until all previous instructions with specified wall-contexts (via wc_map) are completed.<br>FORK/ENDFORK also use this field as they are also blocking. |
| ben_left<br>ben_right | ben_left and ben_right are single bit flags that control if read-modify-writes are used on the left and right edges for writing to an unaligned HBM handle. If set to 0, it defaults to full writes without byte enables for unaligned accesses. This will clobber the existing data but is more efficient. |

TABLE 2-continued

COPY and HBM_COPY Fields Summary

| Field | Notes |
|---|---|
| stride | y co-ordinate (row) striding at the destination HBM. If stride is 0 or 1, the behavior defaults to no stride. Stride field will only be used for Buffer Circuitry to HBM or HBM to HBM copy. Stride support is limited to the case of a source handle that is less than or equal to a 32 × 32 block, i.e., no blocking support is needed for this mode. If stride_en is set the conditions described here are met, Operation Management Circuitry will generate new packet types: HBM_WRITE_STRIDE, HBM_COPY_STRIDE. |

FIGS. 2A, 2B, 3, and 4 are example diagrams that illustrate a number of tensor operations, consistent with embodiments of the present disclosure.

Figure 2A:
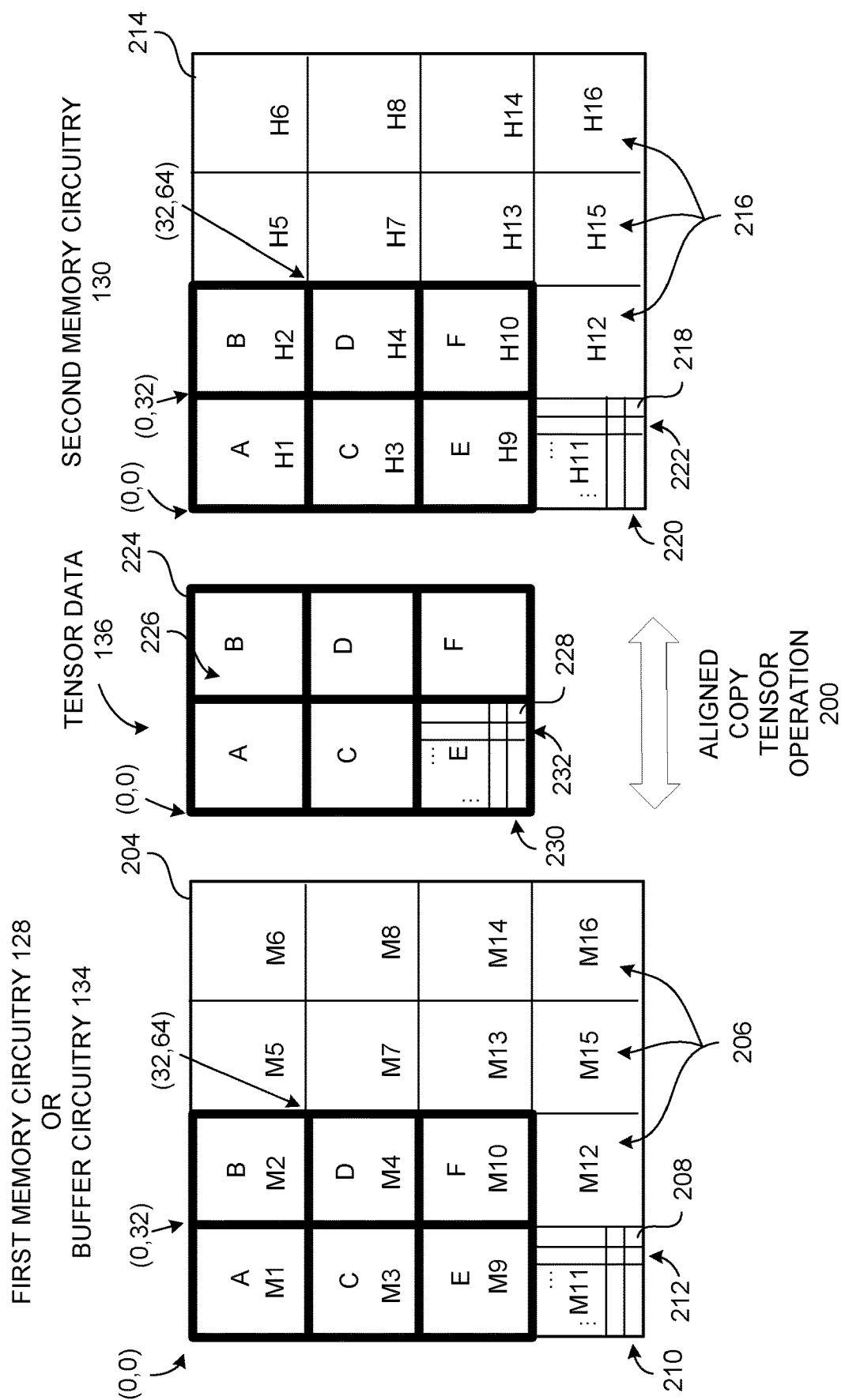
FIGS. 2A and 2B are example diagrams of aligned copy tensor operations and unaligned copy tensor operations, consistent with several embodiments of the present disclosure.
Figure 2B:
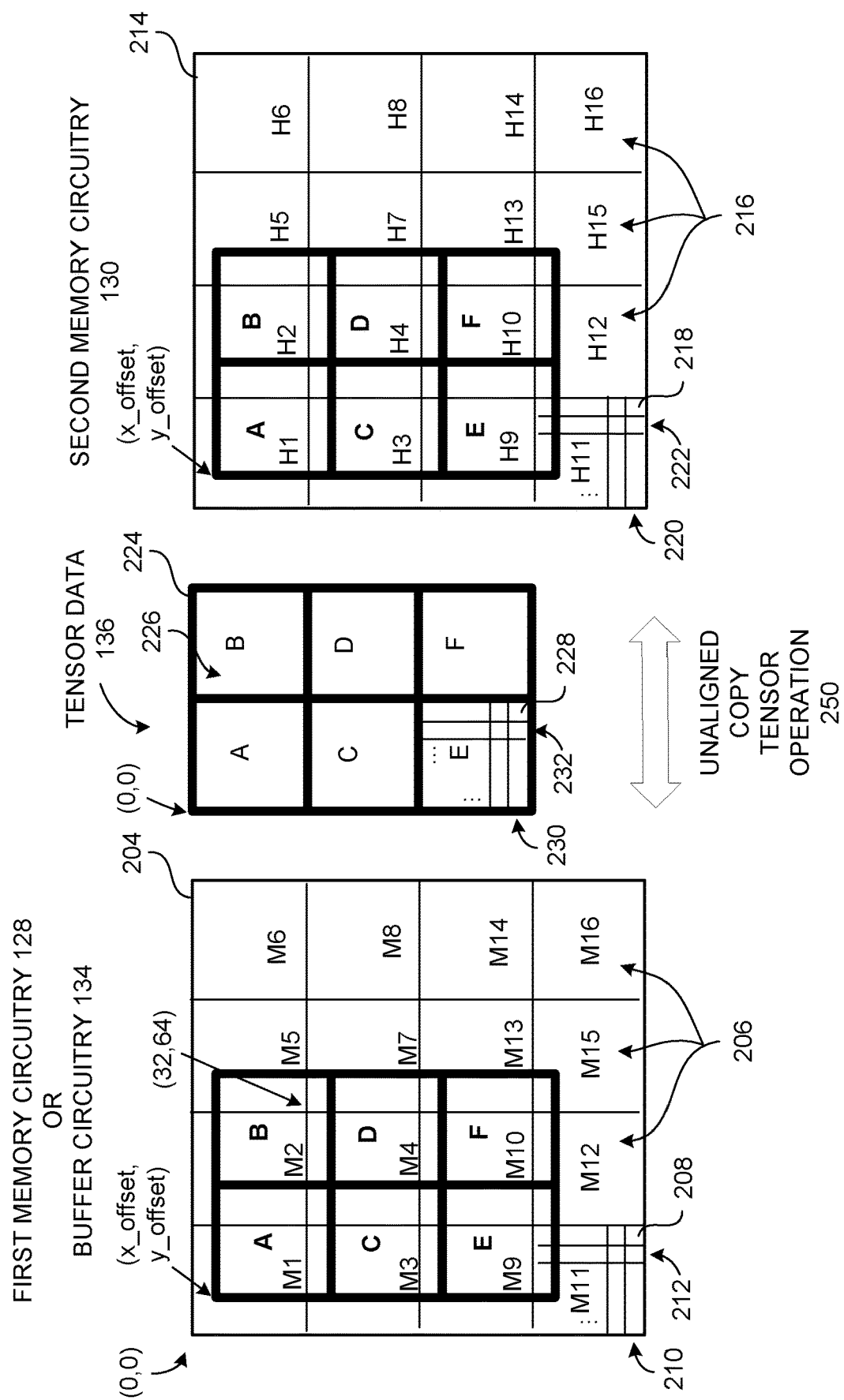

FIGS. 2A and 2B illustrate aligned copy and unaligned copy tensor operations between the first memory circuitry 128 and the second memory circuitry 130, and between the buffer circuitry 134 and the second memory circuitry 130. FIG. 2A illustrates a simplified diagram of an example of an aligned copy tensor operation 200, consistent with embodiments of the disclosure. The aligned copy tensor operation 200 includes copying the tensor data 136. The tensor data 136 may be copied from the first memory circuit 128 to the second memory circuit 130, according to an embodiment. A data processing unit may copy tensor data between one or more additional memory buffer circuitry and memory circuitry.

The first memory circuitry 128 and/or the buffer circuitry 134 may, for illustrative purposes, be represented by a data matrix 204, according to an embodiment. The first memory circuitry 128 may have more, the same, or less memory capacity than the buffer circuitry 134, according to an embodiment. The data matrix 204 includes matrix elements 206 (illustratively labeled as M1-M16). Each of the matrix elements 206 (e.g., matrix element M11) is representative of one or more blocks of data 208. Each of the matrix elements 206 may include rows 210 and columns 212 (e.g., 32 rows and 32 columns) of the blocks of data 208. Each of the blocks of data 208 may include a predetermined size, for example 2 kilobytes (kB) of data. In an embodiment, the data matrix 204 may be a graphical representation or an organizational representation of 32 megabytes (MB) of data (i.e., (16 matrix elements)×(32 rows)×(32 columns)×(of 2 kB of data)).

The second memory circuitry 130 may, for illustrative purposes, be represented by a data matrix 214, according to an embodiment. The data matrix 214 includes matrix elements 216 (illustratively labeled as H1-H16). Each of the matrix elements 216 (e.g., matrix element H11) is representative of one or more blocks of data 218. Each of the matrix elements 216 may include rows 220 and columns 222 (e.g., 32 rows and 32 columns) of the blocks of data 218. Each of the blocks of data 218 may include a predetermined size, for example 2 kilobytes (kB) of data. In an embodiment, the data matrix 214 may be a graphical representation or an organizational representation of 32 megabytes (MB) of data (i.e., (16 matrix elements)×(32 rows)×(32 columns)×(of 2 kB of data)).

The tensor data 136 is represented by a data matrix 224, according to an embodiment. The data matrix 224 includes a number of matrix elements 226 that each include one or more blocks of data 228 that are referenced by rows 230 and columns 232, according to an embodiment. In an embodiment, the data matrix 224 includes: six matrix elements 226; 32 rows 230 and 32 columns 232 within each matrix element 226; and 2 kB of data in each of the blocks of data 228. While the data matrix 224 represents 12 MB data, the data matrix may include more or less than 12 MB of data, according to various implementations.

The aligned copy tensor operation 200 is an aligned copy because the matrix elements 226 of the data matrix 224 align with boundaries of the matrix elements 206 of the data matrix 204. In other words, the defined boundaries of the matrix elements 226 of the data matrix 224 align with the defined boundaries of the matrix elements 206 of the data matrix 204.

When the row and columns of data elements of the tensor data 136 aligns with rows and columns of data elements of the first memory circuitry 128 or buffer circuitry 134 (e.g., data source circuitry), then a copy operation may be an aligned copy. For example, a row/column offset of (0,0) represents one point of alignment for the data matrix 224 and the data matrix 204. However, the data matrix 224 may be copied from other matrix elements 206 and still be in alignment. For example, the data matrix 224 may be copied from coordinates (0,32) of the data matrix 204, such that matrix elements A, B, C, D, E, F align with matrix elements M2, M5, M4, M7, M10, M13. As another example, the data matrix 224 may be copied from coordinates (32,64) of the data matrix 204, such that matrix elements A, B, C, D, E, F align with matrix elements M7, M8, M13, M14, M15, M16. Accordingly, an aligned copy includes alignment of matrix elements 226 with matrix elements 206.

When the row and columns of data elements of the tensor data 136 aligns with rows and columns of data elements of the second memory circuitry 130 (e.g., data destination circuitry), then a copy operation may be an aligned copy. In an embodiment, the boundaries of the tensor data 136 must align with both the data source circuitry and the data destination circuitry to be considered an aligned operation (e.g., an aligned copy operation). A row/column offset of (0,0) represents one point of alignment for the data matrix 224 and the data matrix 214. However, the data matrix 224 may be copied to other matrix elements 216 and still be in alignment. For example, the data matrix 224 may be copied to coordinates (0,32) of the data matrix 214, such that matrix elements A, B, C, D, E, F align with matrix elements H2, H5, H4, H7, H10, H13. As another example, the data matrix 224 may be copied TO coordinates (32,64) of the data matrix 214, such that matrix elements A, B, C, D, E, F align with matrix elements H7, H8, H13, H14, H15, H16. Accordingly, an aligned copy includes alignment of matrix elements 226 with matrix elements 216.

Different types of tensor operations may be achieved using the techniques of the present disclosure. Historically, aligned copies required fewer memory accesses and instructions than unaligned operations. An aligned copy operation may be performed by identifying a source matrix element, by identifying a destination matrix element, and by providing instructions to perform an element by element copy operation. An unaligned copy operation is a copy operation in which the row and column boundaries between the tensor data 136 and the data matrix 204 or the data matrix 214 are not aligned. Historically, unaligned copy operations were either not achievable in traditional GPU and TPU architecture, or were achievable with significant data bandwidth consumption. However, embodiments of the present disclosure may enable various tensor operations (such as types of unaligned copy operations) to be performed (which may not have been possible before) and to be performed using significantly less bandwidth between the CPU 102 and the data processing unit 104 than is used to perform traditional tensor operations.

FIG. 2B illustrates an example diagram of an unaligned copy tensor operation 250, according to an embodiment. In the unaligned copy tensor operation 250, the matrix elements 226 of the tensor data 136 may be mis-aligned with boundaries of matrix elements 206 of the first memory circuitry 128 and the buffer circuitry 134. In the unaligned copy tensor operation 250, the matrix elements 226 of the tensor data 136 may be mis-aligned with boundaries of matrix elements 216 of the second memory circuitry 130. The mis-alignment may result in at least partially accessing 12 different data elements of the source or destination circuitry (as opposed to 6 data elements in the aligned copy scenario), which may include memory accesses or buffer accesses to more memory elements than are needed to capture the data matrix 224 of the tensor data 136. Historically, such an operation, if attempted, would include sending memory access instructions or buffer access instructions from the CPU 102 (shown in FIG. 1) to the data processing unit 104 (shown in FIG. 1) over the one or more channels 106.

The unaligned copy tensor operation 250 may include reading the tensor data 136 from at least part of 12 different matrix elements 206 (e.g., data elements labeled M1, M2, M5, M3, M4, M7, M9, M10, M13, M11, M12, M15) and may include writing the tensor data 136 to at least 12 different data elements (e.g., data elements labeled H1, H2, H5, H3, H4, H7, H9, H10, H13, H11, H12, H15). In traditional GPU and/or TPU architecture, such operations were either not possible or included transmission of access requests for each of the matrix elements 206 and/or 216.

The operation management circuitry 132 (shown in FIG. 1) enables and facilitates unaligned copies between the data matrix 204 and the data matrix 214, according to various embodiments. The operation management circuitry 132 receives a tensor operation 110 (e.g., an aligned copy tensor operation, an unaligned copy tensor operation, a scatter copy tensor operation, a gather copy tensor operation, a convolution copy tensor operation, etc.). The operation management circuitry 132 translates the tensor operation 110 into a plurality of instructions (e.g., the memory sub-system instructions 122) that may be executed by one or more memory controller circuits, so that the plurality of instructions are not transmitted back and forth between the CPU 102 and the data processing unit 104 and are instead communicated between memory controller circuitry and one or more memory circuits, according to an embodiment.

In an embodiment, the system 100 performs the unaligned copy tensor operation 250 by receiving a copy command from the cpu 102, determining address locations in the first memory circuitry 128 or the buffer circuitry 134, determining address locations in the second memory circuitry 130, accessing the address locations in the first memory circuitry 128 or the buffer circuitry 134, accessing the address locations in the second memory circuitry 130, and reading/writing the tensor data 136 from data source circuitry to data destination circuitry, according to an embodiment. Even though the data processing unit 104 may access a larger number of data elements than the size of data elements of tensor data 136, the hardware and software configuration of the data processing unit 104 enables and performs the unaligned copy tensor operation 250 without communicating a plurality of handshaking signal with the CPU 102 to complete the copy operation, according to an embodiment.

The unaligned copy tensor operation 250 includes reading the tensor data 136 starting from a location represented by an x_offset and a y_offset in the data matrix 204, according to an embodiment. The unaligned copy tensor operation 250 includes writing the tensor data 136 to locations initially represented by x_offset and a y_offset in the data matrix 214, according to an embodiment.

Referring briefly to Table 1 and Table 2, in the COPY instruction, the x and y offset can be unaligned. If x is unaligned, ben_left and ben_right are used to determine if the memory circuitry (e.g., in multiples of 32) row is completely over-written or if a read-modify-write (RMW) is performed. If operands are unaligned and span multiple max block/burst access units (e.g., 32×32 blocks), the source and destination operands can be identically unaligned, i.e., with the same x and y offsets. An unaligned COPY may be configured to support 64K×64K (or larger) sized tensor data manipulation in a single instruction, according to an embodiment.

Figure 3:
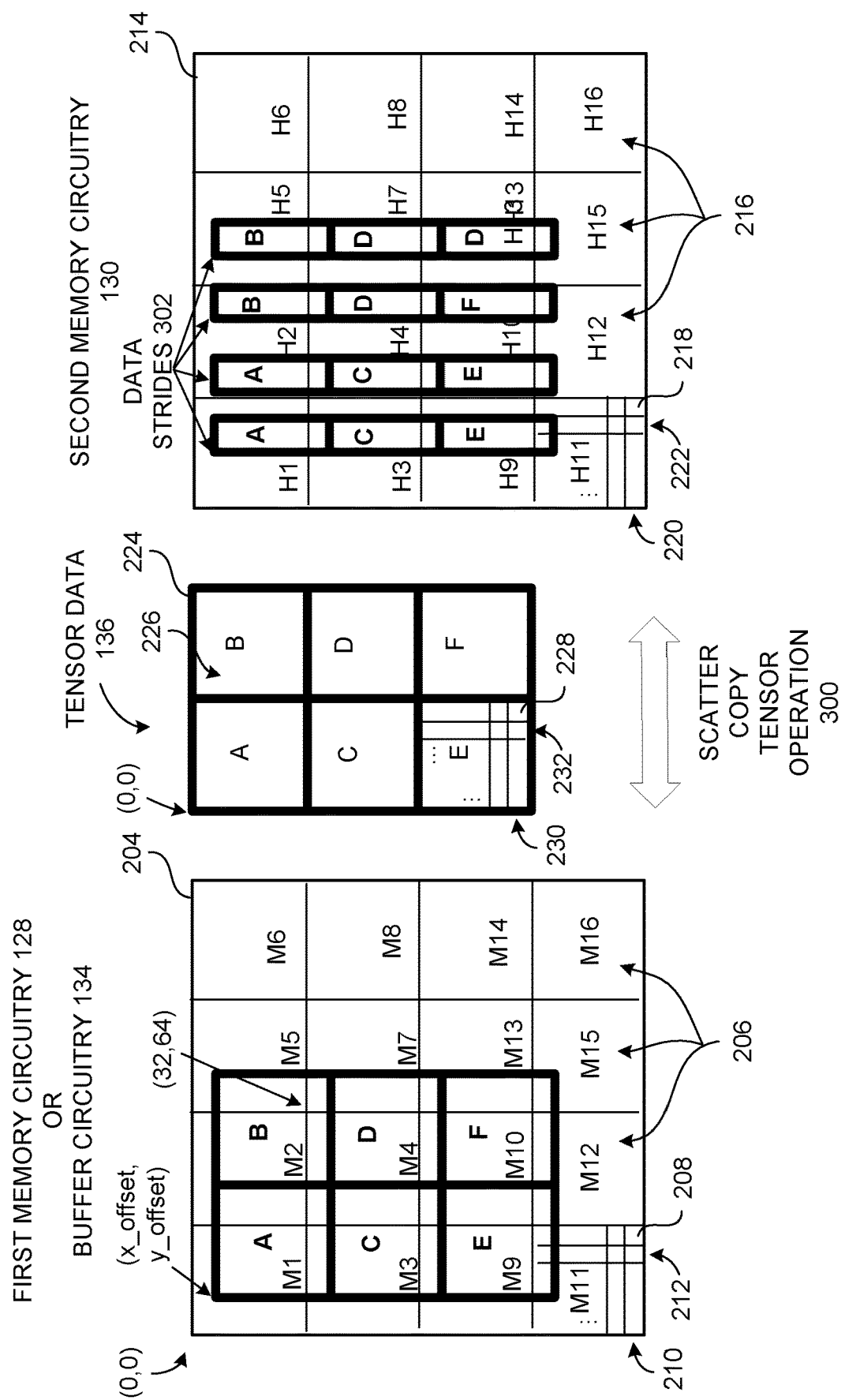
FIG. 3 is an example diagram of a scatter copy tensor operation, consistent with several embodiments of the present disclosure.

FIG. 3 illustrates an example diagram of a scatter copy tensor operation 300, according to an embodiment. The scatter copy tensor operation 300 is illustrated as an unaligned copy operation, but the scatter copy tensor operation 300 may also be an aligned copy operation, according to an embodiment. In the scatter copy tensor operation 300, the data processing unit 104 writes the tensor data 136 in data strides 302 in the data matrix 214 and in the second memory circuitry 130, according to an embodiment. In other words, the tensor data 136 is written to the second memory circuitry 130 in non-contiguous memory locations. The data strides 302 may be written as non-contiguous columns (as shown) or may be written as non-contiguous rows. The scatter copy tensor operation 300 may be used to pre-format the tensor data 136 in preparation for one or more subsequent data operations (e.g., to facilitate a tensor dimension shuffle, a convolution operation, or some other machine learning operation), according to an embodiment.

Figure 4:
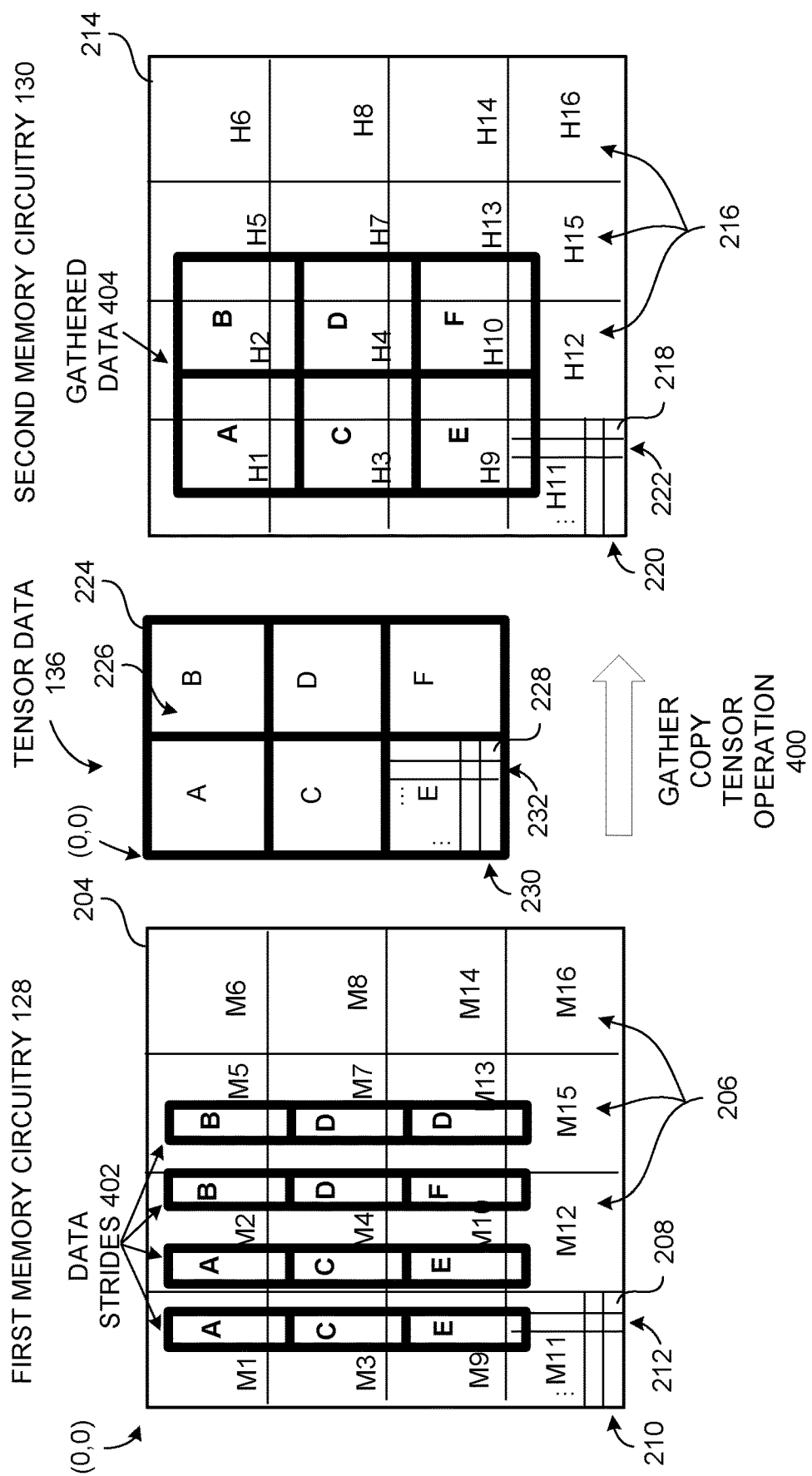
FIG. 4 is an example diagram of a gather copy tensor operation, consistent with several embodiments of the present disclosure.

FIG. 4 illustrates an example diagram of a gather copy tensor operation 400, according to an embodiment. The gather copy tensor operation 400 is illustrated as an unaligned copy operation, but the gather copy tensor operation 400 may also be an aligned copy operation, according to an embodiment. In the gather copy tensor operation 400, the data processing unit 104 reads the tensor data 136 from data strides 402 in the data matrix 204 from the first memory circuitry 128, according to an embodiment. In other words, the tensor data 136 is read from the first memory circuitry 128 in non-contiguous memory locations. The data strides 402 may be read as non-contiguous columns (as shown) or may be read as non-contiguous rows. Through the gather copy tensor operation 400, the data processing unit 104 writes the tensor data 136 as contiguous matrix elements 226 within the data matrix 214 of the second memory circuitry 130, according to an embodiment. The gather copy tensor operation 400 may be used to pre-format the tensor data 136 in preparation for one or more subsequent data operations (e.g., to facilitate a tensor dimension shuffle, a convolution operation, or some other machine learning operation), according to an embodiment.

Figure 5A:
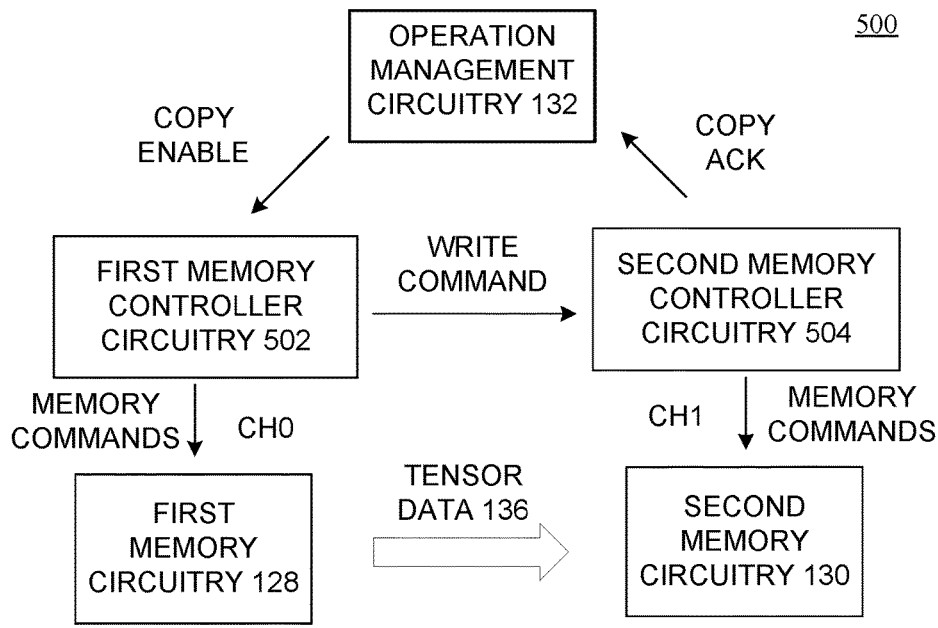
FIGS. 5A and 5B are a functional flow diagrams of copy tensor operations, consistent with several embodiments of the present disclosure.
Figure 5B:
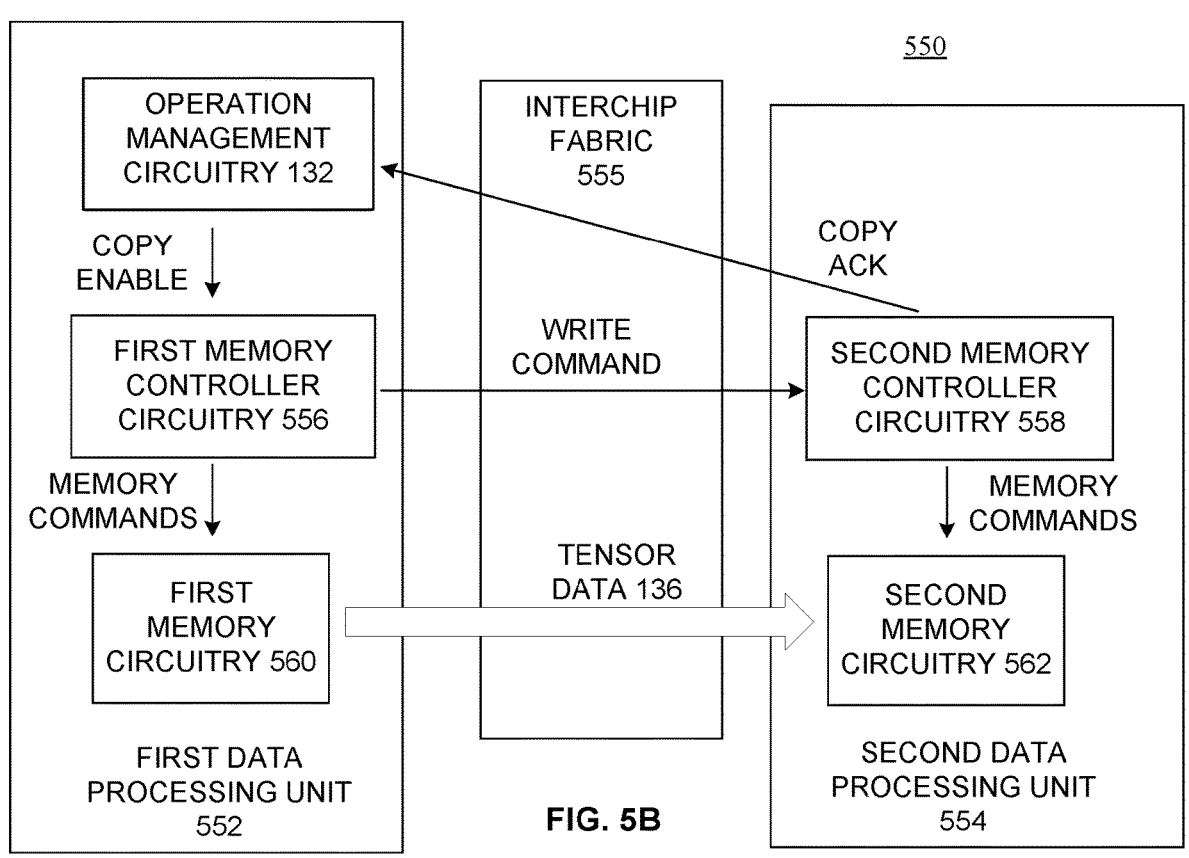

FIGS. 5A and 5B illustrate copy operations between different memory circuitry, consistent with embodiments of the present disclosure. FIG. 5A illustrates a functional flow diagram of a copy operation 500 between two memory channels in a data processing unit, according to an embodiment. The operation management circuitry 132 provides a copy enable command to first memory controller circuitry 502, according to an embodiment. In response to the copy enable command, the first memory controller circuitry 502 transmits memory commands over a first channel CH0 to the first memory circuitry 128, according to an embodiment. In response to the copy enable command, the first memory controller circuitry 502 also transmits a write command to second memory controller circuitry 504, according to an embodiment. The first memory controller circuitry 502 transmits the memory commands to the first memory circuitry 128 and transmits the write command to the second memory controller circuitry 504, to copy the tensor data 136 from the first memory circuitry 128 to the second memory circuitry 130. Upon receipt of the write command, the second memory controller circuitry 504 provides memory commands to the second memory circuitry 130 over a second channel CH1, to write the tensor data 136 to the second memory circuitry 130, according to an embodiment. Upon completion of writing the tensor data 136 to the second memory circuitry 130, the second memory controller circuitry 504 provides a copy acknowledge to the operation management circuitry 132, according to an embodiment.

FIG. 5B illustrates a functional flow diagram of a copy operation 550 between a first data processing unit 552 and a second data processing unit 554, according to an embodiment. The first data processing unit 552 may represent a first integrated circuit or first "chip", and the second data processing unit 554 may represent a second integrated circuit or a second chip. The first data processing unit 552 copies the tensor data 136 to a second data processing unit 554 through an interchip fabric 555, according to an embodiment. The interchip fabric 555 represent one or more hardware components, e.g., buses, connectors, communication circuitry, wiring, traces, etc., that enable the first data processing unit 552 to communicate information to and from the second data processing unit 554, according to an embodiment.

To perform the copy operation 550, the operation management circuitry 132 provides a copy enable command to first memory controller circuitry 556 of the first data processing unit 552. In response to receipt of the copy enable command, the first memory controller circuitry 556 provides a write command to the second memory controller circuitry 558 of the second data processing unit 554. The first memory controller circuitry 556 provides memory commands to the first memory circuitry 560, and the second memory controller circuitry 558 provides memory commands to second memory circuitry 562, to read the tensor data 136 from the first memory circuitry 560 and to write the tensor data 136 to the second memory circuitry 562, according to one embodiment. To complete the copy operation 550, the second memory controller circuitry 558 may provide a copy acknowledge to the operation management circuitry 132 through the interchip fabric 555.

Figure 6:
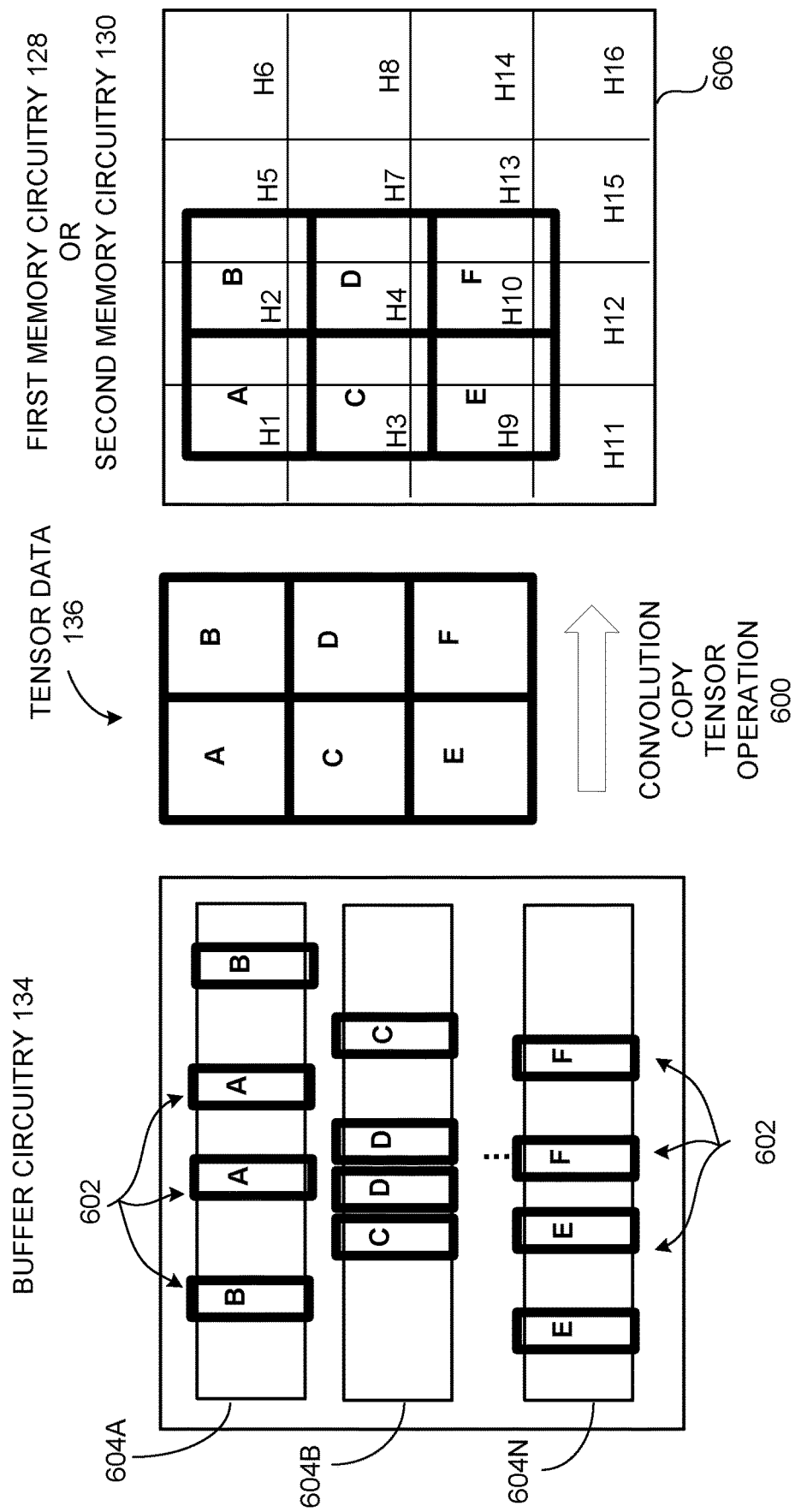
FIG. 6 is an example diagram of a convolution copy tensor operation, consistent with several embodiments of the present disclosure.

FIG. 6 illustrates an example diagram of a convolution copy tensor operation 600, according to an embodiment. The convolution copy tensor operation 600 is illustrated as an unaligned copy operation, but the convolution copy tensor operation 600 may also be an aligned copy operation (at the destination circuitry), according to an embodiment. In the convolution copy tensor operation 600, the data processing unit 104 reads the tensor data 136 from data locations 602 that are distributed non-contiguously among one or more buffer banks 604 (inclusive of buffer banks 604A, 604B, . . . 604N) for the buffer circuitry 134, according to an embodiment. In other words, the tensor data 136 is read from the buffer circuitry 134 in non-contiguous buffer locations, which may be data strides. Through the convolution copy tensor operation 600, the data processing unit 104 writes the tensor data 136 as contiguous matrix elements 226 within the data matrix 606 of the first memory circuitry 128 or the second memory circuitry 130, according to an embodiment. The convolution copy tensor operation 600 may be used to pre-format the tensor data 136 in preparation for one or more subsequent data operations (e.g., to facilitate a tensor dimension shuffle, a convolution operation, or some other machine learning operation), according to an embodiment.

Figure 7:
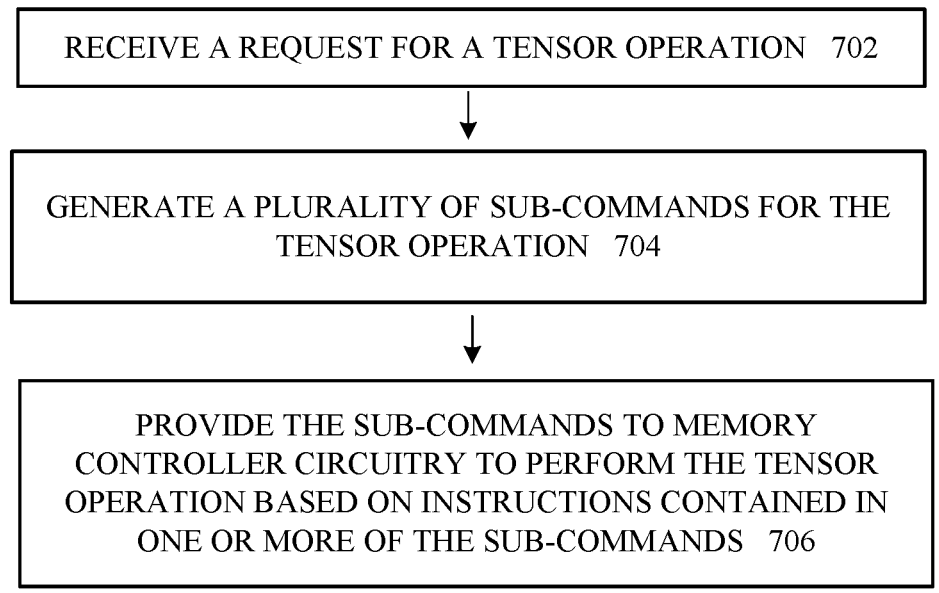
FIG. 7 is an example flow diagram of a process for performing tensor operations with a data processing unit, consistent with several embodiments of the present disclosure.

FIG. 7 illustrates an example flow diagram of a process 700 for performing tensor operations with a data processing unit, according to an embodiment.

At operation 702, the process 700 includes receiving a request for a tensor operation, according to an embodiment.

At operation 704, the process 700 includes generating a plurality of sub-command for the tensor operation, according to an embodiment.

At operation 706, the process 700 includes providing the sub-commands to memory controller circuitry to perform the tensor operation based on instructions contained in one or more of the sub-commands, according to an embodiment.

Figure 8:
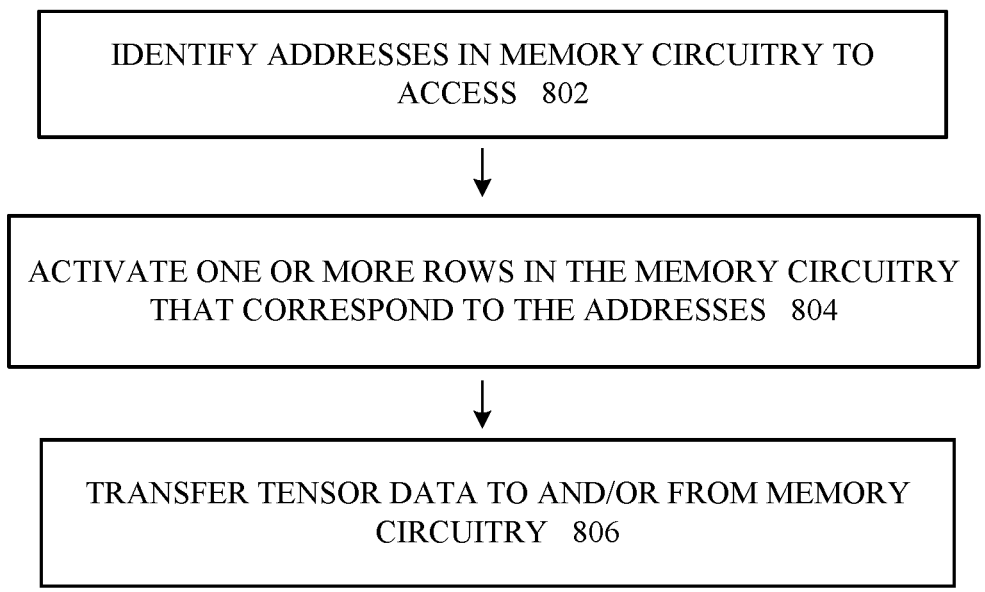
FIG. 8 is an example flow diagram of a process for executing tensor operation sub-commands with memory controller circuitry, consistent with several embodiments of the present disclosure.

FIG. 8 illustrates an example flow diagram of a process 800 for executing tensor operation sub-commands with memory controller circuitry, according to an embodiment.

At operation 802, the process 800 includes identifying addresses in memory circuitry to access, according to an embodiment.

At operation 804, the process 800 includes activating one or more rows in the memory circuitry that correspond to the addresses, according to an embodiment.

At operation 806, the process 800 includes transferring tensor data to and/or from memory circuitry, according to an embodiment. In one embodiment, the tensor data is transferred to memory circuitry from buffer circuitry. In one embodiment, the tensor data is transferred from memory circuitry to buffer circuitry. In one embodiment, the tensor data is transferred from first memory circuitry to second memory circuitry.

Figure 9:
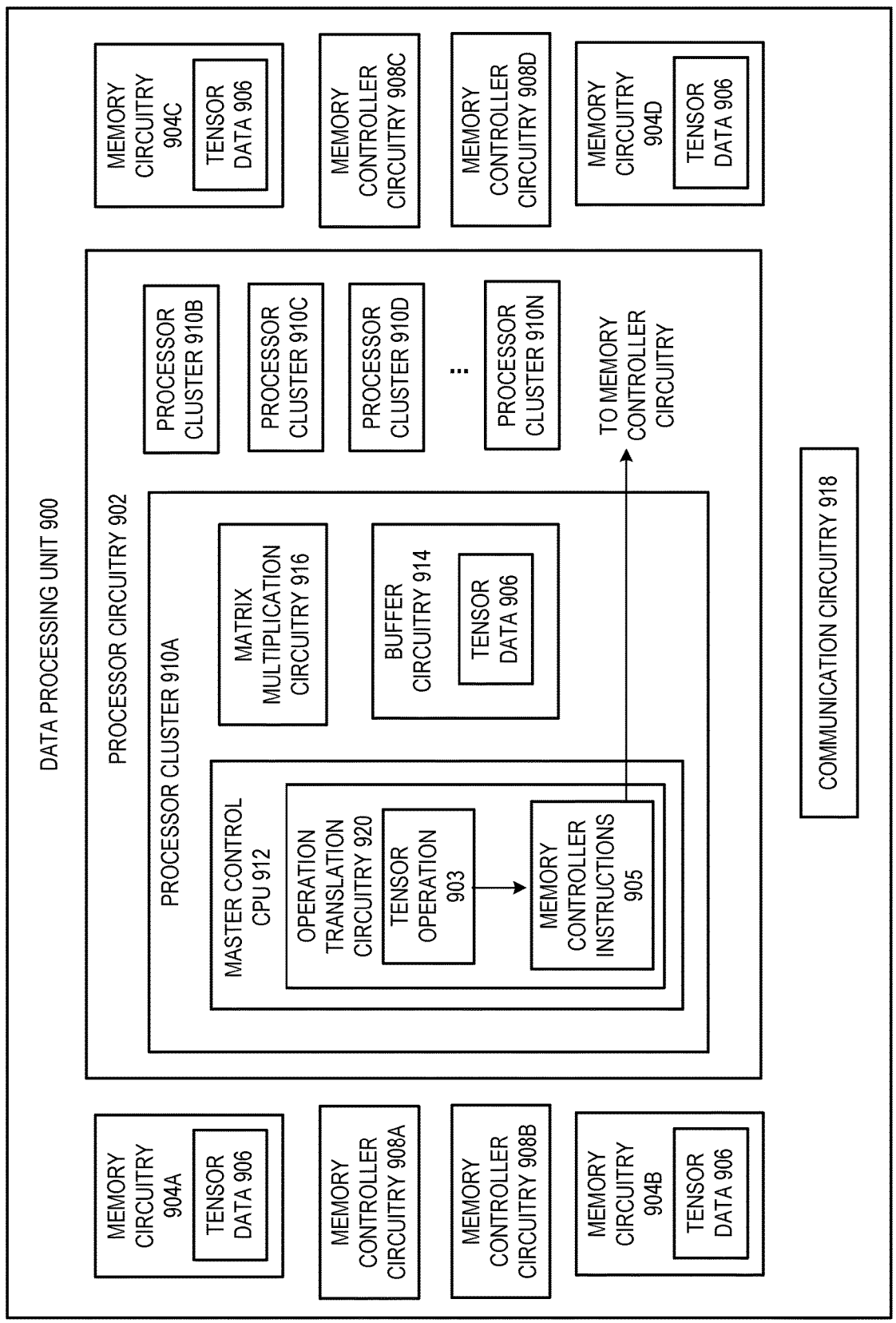
FIG. 9 is an example functional block diagram of an implementation of a data processing unit, consistent with several embodiments of the present disclosure.

FIG. 9 is a block diagram of an example implementation of a data processing unit 900, consistent with embodiments of the present disclosure. The data processing unit 900 is an example implementation of the data processing unit 104 (shown in FIG. 1), according to an embodiment. The data processing unit 900 includes processor circuitry 902 to translate a tensor operation 903 into one or more memory controller instructions 905. The processor circuitry 902 and translates the tensor operation 903 into one or more memory controller instructions 905 in order to facilitate moving tensor data 906 between the processor circuitry 902 and the memory circuitry 904, according to an embodiment. The data processing unit 900 includes memory circuitry 904 (inclusive of memory circuitry 904A, 904B, 904C, 904D) to store at least part of the tensor data 906. The processor circuitry 902 transmit the tensor operation 903 into one or more memory controller instructions 905 that cause the memory controller circuitry 908 (inclusive of the memory controller circuitry 908A, 908B, 908C, 908D) to move the tensor data 906 between the processor circuitry 902 and the memory circuitry 904, according to an embodiment.

The processor circuitry 902 includes processor clusters 910 (inclusive of processor cluster 910A, 910B, 910C, 910D, . . . 910N), according to an embodiment. Although five processing clusters 910 are illustrated, the data processing unit 900 or the processor circuitry 902 may include tens, hundreds, or thousands of processor clusters 910, according to various embodiments. A processing cluster is an organization of various redundant subcomponents of the processor circuitry 902.

The processor cluster 910A includes a master control CPU 912, buffer circuitry 914, and matrix multiplication circuitry 916, according to an embodiment. The master control CPU 912 receives the tensor operation 903, with the communication circuitry 918, from sources external to the data processing unit 900. The master control CPU 912 is an example implementation of the operation management circuitry 132 (shown in FIG. 1), according to an embodiment. The master control CPU 912 includes operation translation circuitry 920, according to an embodiment. The operation translation circuitry 920 converts the tensor operation 903 into the one or more memory controller instructions 905, according to an embodiment. Among other things, the operation translation circuitry 920 may include one or more tables or data structures to facilitate translating the tensor operation 903 into one or more memory controller instructions 905, according to an embodiment. The buffer circuitry 914 includes one or more buffer banks that are used by the processor cluster 910A to temporarily store the tensor data 906 while the master control CPU 912 performs operations on the tensor data 906, according to an embodiment. The matrix multiplication circuitry 916 supports the processor cluster 910A in performing matrix multiplication operations, according to an embodiment.

Figure 10:
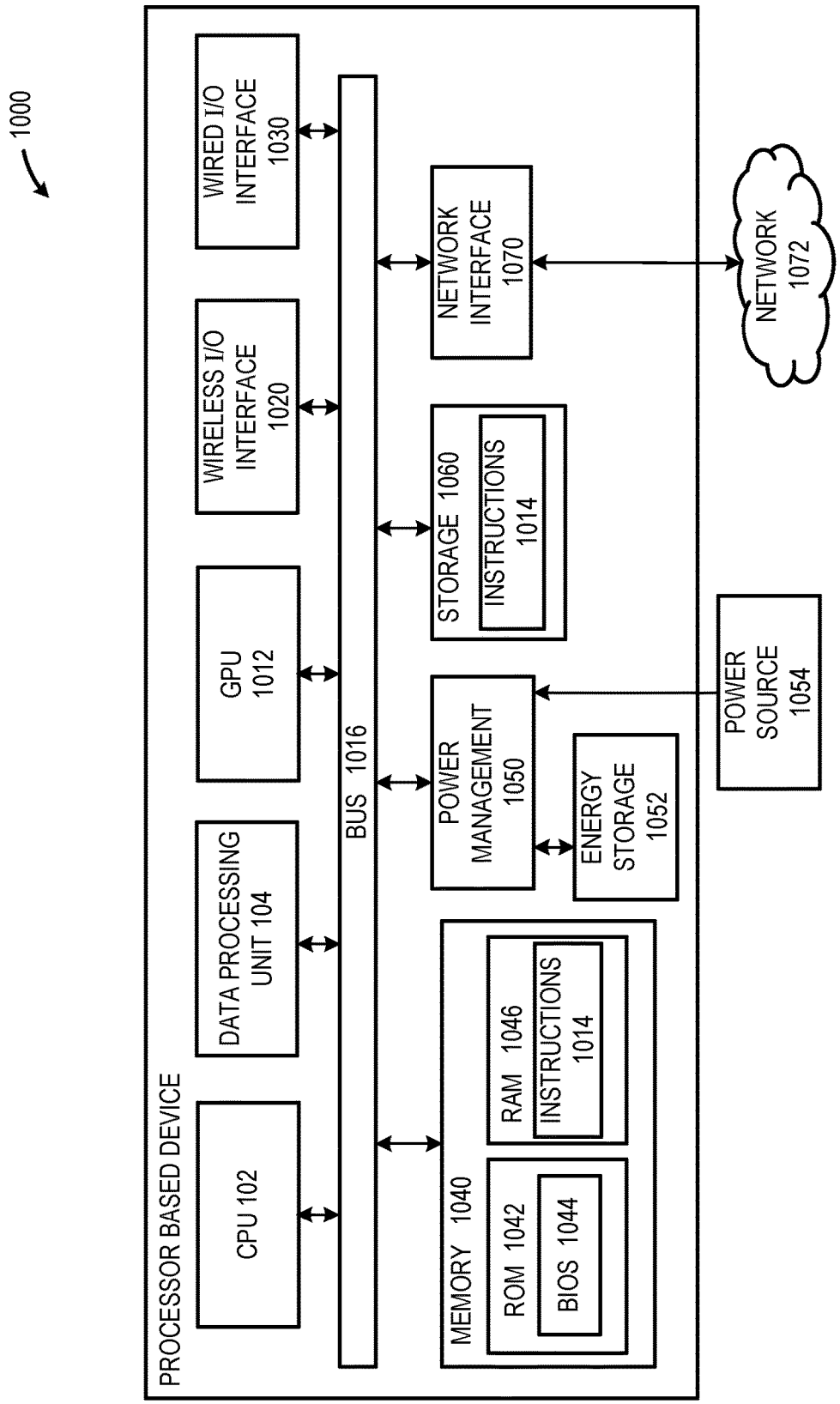
FIG. 10 illustrate a block diagram of an electronic processor-based device that includes a data processing unit to perform tensor operations received from a CPU, consistent with several embodiments of the present disclosure.

FIG. 10 is a schematic diagram of an illustrative electronic processor-based device 1000 that includes a data processing unit 104 to perform tensor operations received from the CPU 102, in accordance with at least one embodiment described herein. The processor-based device 1000 may additionally include one or more of the following: a graphical processing unit (GPU) 1012, a wireless input/output (I/O) interface 1020, a wired I/O interface 1030, system memory 1040, power management circuitry 1050, the non-transitory storage device 1060, and a network interface 1070. The following discussion provides a brief, general description of the components forming the illustrative processor-based device 1000. Example, non-limiting processor-based devices 1000 may include, but are not limited to: smartphones, wearable computers, portable computing devices, handheld computing devices, desktop computing devices, blade server devices, workstations, and similar.

The processor-based device 1000 includes the data processing unit 104 configured to convert a tensor operation (e.g., tensor operation 110 of FIG. 1) into a number of memory sub-system commands to reduce machine learning operations latency and to enable additional tensor operations within the data processing unit 104, according to an embodiment. In embodiments, the processor-based device 1000 includes the CPU 102 and/or the data processing unit 104 being capable of executing one or more machine-readable instructions 1014, reading data and/or instructions 1014 from one or more storage devices 1060 and writing data to the one or more storage devices 1060.

In some embodiments, the processor-based device 1000 includes graphical processing unit 1012 capable of executing machine-readable instructions 1014 and generating an output signal capable of providing a display output to a system user. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The data processing unit 104 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The processor-based device 1000 includes a bus or similar communications link 1016 that communicably couples and facilitates the exchange of information and/or data between various system components including the CPU 102, the data processing unit 104, the graphical processing unit 1012, one or more wireless I/O interfaces 1020, one or more wired I/O interfaces 1030, one or more storage devices 1060, and/or one or more network interfaces 1070. The processor-based device 1000 may be referred to in the singular herein, but this is not intended to limit the embodiments to a single processor-based device 1000, since in certain embodiments, there may be more than one processor-based device 1000 that incorporates, includes, or contains any number of communicably coupled, collocated, or remote networked circuits or devices.

The data processing unit 104 is a neural network processor implemented as an application specific integrated circuit, in an embodiment. The data processing unit 104 may include any number, type, or combination of currently available or future developed devices capable of executing machine-readable instruction sets. The data processing unit 104 may include, but is not limited to, any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless otherwise, the construction and operation of the various blocks shown in FIG. 10 are of conventional design. Consequently, such blocks need not be described in further detail herein, as they will be understood by those skilled in the relevant art. The bus 1016 that interconnects at least some of the components of the processor-based device 1000 may employ any currently available or future developed serial or parallel bus structures or architectures.

The system memory 1040 may include read-only memory ("ROM") 1042 and random access memory ("RAM") 1046. A portion of the ROM 1042 may be used to store or otherwise retain a basic input/output system ("BIOS") 1044. The BIOS 1044 provides basic functionality to the processor-based device 1000, for example by causing the CPU 102 and/or the data processing unit 104 to load and/or execute one or more machine-readable instructions 1014. In embodiments, at least some of the one or more machine-readable instructions 1014 cause at least a portion of the data processing unit 104 to provide, create, produce, transition, and/or function as a dedicated, specific, and particular machine, for example a word processing machine, a digital image acquisition machine, a media playing machine, a gaming system, a communications device, a smartphone, or similar.

The processor-based device 1000 may include at least one wireless input/output (I/O) interface 1020. The at least one wireless I/O interface 1020 may be communicably coupled to one or more physical output devices (e.g., tactile devices, video displays, audio output devices, hardcopy output devices, etc.). The at least one wireless I/O interface 1020 may communicably couple to one or more physical input devices (e.g., pointing devices, touchscreens, keyboards, tactile devices, etc.). The at least one wireless I/O interface 1020 may include any currently available or future developed wireless I/O interface. Example wireless I/O interfaces include, but are not limited to: BLUETOOTH®, near field communication (NFC), and similar.

The processor-based device 1000 may include one or more wired input/output (I/O) interfaces 1030. The at least one wired I/O interface 1030 may be communicably coupled to one or more physical output devices (e.g., tactile devices, video displays, audio output devices, hardcopy output devices, etc.). The at least one wired I/O interface 1030 may be communicably coupled to one or more physical input devices (e.g., pointing devices, touchscreens, keyboards, tactile devices, etc.). The wired I/O interface 1030 may include any currently available or future developed I/O interface. Example wired I/O interfaces include, but are not limited to: universal serial bus (USB), IEEE 1394 ("FireWire"), and similar.

The processor-based device 1000 may include one or more communicably coupled, non-transitory, data storage devices 1060. The data storage devices 1060 may include one or more hard disk drives (HDDs) and/or one or more solid-state storage devices (SSDs). The one or more data storage devices 1060 may include any current or future developed storage appliances, network storage devices, and/or systems. Non-limiting examples of such data storage devices 1060 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 1060 may include one or more removable storage devices, such as one or more flash drives, flash memories, flash storage units, or similar appliances or devices capable of communicable coupling to and decoupling from the processor-based device 1000.

The one or more data storage devices 1060 may include interfaces or controllers (not shown) communicatively coupling the respective storage device or system to the bus 1016. The one or more data storage devices 1060 may store, retain, or otherwise contain machine-readable instruction sets, data structures, program modules, data stores, databases, logical structures, and/or other data useful to the CPU 102, the data processing unit 104, and the graphical processing unit 1012. In some instances, one or more data storage devices 1060 may be communicably coupled to the CPU 102 and/or the data processing unit 104, for example via the bus 1016 or via one or more wired communications interfaces 1030 (e.g., Universal Serial Bus or USB); one or more wireless communications interfaces 1020 (e.g., Bluetooth®, Near Field Communication or NFC); and/or one or more network interfaces 1070 (IEEE 802.3 or Ethernet, IEEE 802.11, or WiFi®, etc.).

Processor-readable instructions 1014 and other programs, applications, logic sets, and/or modules may be stored in whole or in part in the system memory 1040. Such instructions 1014 may be transferred, in whole or in part, from the one or more data storage devices 1060. The instructions 1014 may be loaded, stored, or otherwise retained in system memory 1040, in whole or in part, during execution by the data processing unit 104 and/or graphical processing unit 1012.

The processor-based device 1000 may include power management circuitry 1050 that controls one or more operational aspects of the energy storage device 1052. In embodiments, the energy storage device 1052 may include one or more primary (i.e., non-rechargeable) or secondary (i.e., rechargeable) batteries or similar energy storage devices. In embodiments, the energy storage device 1052 may include one or more supercapacitors or ultracapacitors. In embodiments, the power management circuitry 1050 may alter, adjust, or control the flow of energy from an external power source 1054 to the energy storage device 1052 and/or to the processor-based device 1000. The power source 1054 may include, but is not limited to, a solar power system, a commercial electric grid, a portable generator, an external energy storage device, or any combination thereof.

For convenience, the CPU 102, the data processing unit 104, the graphical processing unit 1012, the wireless I/O interface 1020, the wired I/O interface 1030, the power management circuitry 1050, the storage device 1060, and the network interface 1070 are illustrated as communicatively coupled to each other via the bus 1016, thereby providing connectivity between the above-described components. In alternative embodiments, the above-described components may be communicatively coupled in a different manner than illustrated in FIG. 10. For example, one or more of the above-described components may be directly coupled to other components, or may be coupled to each other, via one or more intermediary components (not shown). In another example, one or more of the above-described components may be integrated into the data processing unit 104 and/or the graphical processing unit 1012. In some embodiments, all or a portion of the bus 1016 may be omitted and the components are coupled directly to each other using suitable wired or wireless connections.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by a processor executing code and/or instructions sets (e.g., software, firmware, etc.) corresponding to the functionality described herein, thus transforming a general-purpose processor into a specific-purpose processing environment to perform one or more of the operations described herein. In some embodiments, the various components and circuitry of the memory controller circuitry or other systems may be combined in a system-on-a-chip (SoC) architecture.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog—Unified Hardware Design, Specification, and Verification Language, dated Jul. 7, 2011; IEEE Std 1800™-2012: IEEE Standard for SystemVerilog-Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards.

EXAMPLES

Examples of the present disclosure include subject material such as a method, a device, an apparatus, or a system related to predictive detection of user intent for stylus use, as discussed below.

Example 1

According to this example, there is provided an apparatus. The apparatus includes memory circuitry to store tensor data representing a tensor; memory controller circuitry to access the memory circuitry; and processor circuitry to: receive a request for a tensor operation; generate a plurality of sub-commands for the tensor operation; and provide the sub-commands to memory controller circuitry to perform the tensor operation based on instructions contained in one or more of the sub-commands, wherein the instructions contained in one or more of the sub-commands include: identify addresses in the memory circuitry to access; activate one or more rows in the memory circuitry that correspond to the addresses; and transfer tensor data to and/or from the memory circuitry.

Example 2

This example includes the elements of example 1, wherein the tensor operation is a copy operation from buffer circuitry to the memory circuitry.

Example 3

This example includes the elements of example 2, wherein the copy operation from the buffer circuitry to the memory is a scatter copy operation to non-contiguous memory locations in the memory circuitry.

Example 4

This example includes the elements of example 1, wherein the memory circuitry includes a first memory die and a second memory die, wherein the tensor operation is a copy operation from the first memory die to the second memory die.

Example 5

This example includes the elements of example 4, wherein the copy operation from the first memory die is a gather copy operation from non-contiguous memory locations in the first memory die to contiguous memory locations in the second memory die.

Example 6

This example includes the elements of example 1, wherein the tensor operation is a copy from the memory circuitry to buffer circuitry and the data is gathered from non-contiguous addresses within the memory circuitry to contiguous locations within the buffer circuitry.

Example 7

This example includes the elements of example 1, wherein the tensor operation is a convolution copy from buffer circuitry to the memory circuitry, wherein the convolution copy includes copying the tensor data from non-contiguous buffer locations to contiguous locations in the memory circuitry.

Example 8

This example includes the elements of example 1, wherein the tensor operation is a copy operation that includes unaligned boundaries for the tensor data in the memory circuitry.

Example 9

This example includes the elements of example 1, wherein the tensor operation is a copy operation from buffer circuitry to the memory circuitry, wherein the tensor data is read from matrix elements in the buffer circuitry that are unaligned with matrix elements for the tensor data.

Example 10

According to this example, there is provided a method. The method includes receiving, with a data processing unit, a request for a tensor operation, from a central processing unit; generating a plurality of sub-commands for the tensor operation; and providing the sub-commands to memory controller circuitry to perform the tensor operation based on instructions contained in one or more of the sub-commands, wherein the instructions contained in one or more of the sub-commands include: identifying addresses in the memory circuitry to access; activating one or more rows in the memory circuitry that correspond to the addresses; and transferring tensor data to and/or from the memory circuitry.

Example 11

This example includes the elements of example 10, wherein the tensor operation is a copy operation from buffer circuitry to the memory circuitry.

Example 12

This example includes the elements of example 11, wherein the copy operation from the buffer circuitry to the memory is a scatter copy operation to non-contiguous memory locations in the memory circuitry.

Example 13

This example includes the elements of example 10, wherein the memory circuitry includes a first memory die and a second memory die, wherein the tensor operation is a copy operation from the first memory die to the second memory die.

Example 14

This example includes the elements of example 13, wherein the copy operation from the first memory die is a gather copy operation from non-contiguous memory locations in the first memory die to contiguous memory locations in the second memory die.

Example 15

This example includes the elements of example 10, wherein the tensor operation is a copy from the memory circuitry to buffer circuitry and the data is gathered from non-contiguous addresses within the memory circuitry to contiguous locations within the buffer circuitry.

Example 16

This example includes the elements of example 10, wherein the tensor operation is a convolution copy from buffer circuitry to the memory circuitry, wherein the convolution copy includes copying the tensor data from non-contiguous buffer locations to contiguous locations in the memory circuitry.

Example 17

This example includes the elements of example 10, wherein the tensor operation is a copy operation that includes unaligned boundaries for the tensor data in the memory circuitry.

Example 18

This example includes the elements of example 10, wherein the tensor operation is a copy operation from buffer circuitry to the memory circuitry, wherein the tensor data is read from matrix elements in the buffer circuitry that are unaligned with matrix elements for the tensor data.

Example 19

According to this example, there is provided a system. The system includes a central processing unit; and a data processing unit communicatively coupled to the central processing unit, comprising: memory circuitry to store tensor data representing a tensor; memory controller circuitry to access the memory circuitry; and processor circuitry to: receive a request for a tensor operation; generate a plurality of sub-commands for the tensor operation; and provide the sub-commands to memory controller circuitry to perform the tensor operation based on instructions contained in one or more of the sub-commands, wherein the instructions contained in one or more of the sub-commands include: identify addresses in the memory circuitry to access; activate one or more rows in the memory circuitry that correspond to the addresses; and transfer tensor data to and/or from the memory circuitry.

Example 20

This example includes the elements of example 19, wherein the data processing unit is a tensor processing unit to perform neural network processing.

Example 21

This example includes the elements of example 19, wherein the memory circuitry includes a first memory die and a second memory die, wherein the tensor operation is a copy operation from the first memory die to the second memory die.

Example 22

This example includes the elements of example 21, wherein the copy operation from the first memory die is a gather copy operation from non-contiguous memory locations in the first memory die to contiguous memory locations in the second memory die.

Example 23

This example includes the elements of example 19, wherein the tensor operation is a copy from the memory circuitry to buffer circuitry and the data is gathered from non-contiguous addresses within the memory circuitry to contiguous locations within the buffer circuitry.

Example 24

This example includes the elements of example 19, wherein the tensor operation is a convolution copy from buffer circuitry to the memory circuitry, wherein the convolution copy includes copying the tensor data from non-contiguous buffer locations to contiguous locations in the memory circuitry.

Example 25

This example includes the elements of example 19, wherein the tensor operation is a copy operation that includes unaligned boundaries for the tensor data in the memory circuitry.

Example 26

This example includes the elements of example 19, wherein the tensor operation is a copy operation from buffer circuitry to the memory circuitry, wherein the tensor data is read from matrix elements in the buffer circuitry that are unaligned with matrix elements for the tensor data

Example 27

According to this example, there is provided a computer readable device storing instructions that, if executed by one or more processors, performs the method of any one of examples 10 to 18.

Example 28

According to this example, there is provided a device comprising means to perform the method of any one of examples 10 to 18.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
   memory circuitry to store tensor data representing a tensor;
   memory controller circuitry to access the memory circuitry; and
   processor circuitry to:
      receive at least one machine learning operation including tensor operations from a central processing unit, wherein a first one of the tensor operations is a copy operation from buffer circuitry to the memory circuitry and the copy operation from the buffer circuitry to the memory circuitry is a scatter copy operation to non-contiguous memory locations in the memory circuitry;
      perform at least one operation on the tensor data in accordance with the at least one machine learning operation;
      generate a plurality of sub-commands for the tensor operations;
      provide the sub-commands to the memory controller circuitry to perform the tensor operations,
      wherein the plurality of sub-commands include:
         identify addresses in the memory circuitry to access;
         activate one or more rows in the memory circuitry that correspond to the addresses;
         transfer the tensor data to and/or from the memory circuitry; and
      transmit machine learning results associated with the performance of the at least one operation on the tensor data to the central processing unit.

2. The apparatus of claim 1, wherein the memory circuitry includes a first memory die and a second memory die, wherein a second one of the tensor operations is a copy operation from the first memory die to the second memory die.

3. The apparatus of claim 2, wherein the copy operation from the first memory die is a gather copy operation from non-contiguous memory locations in the first memory die to contiguous memory locations in the second memory die.

4. The apparatus of claim 1, wherein a second one of the tensor operations is a copy operation from the memory circuitry to the buffer circuitry and the data is gathered from non-contiguous addresses within the memory circuitry to contiguous locations within the buffer circuitry.

5. The apparatus of claim 1, wherein a second one of the tensor operations is a convolution copy from the buffer circuitry to the memory circuitry, wherein the convolution copy includes copying the tensor data from non-contiguous buffer locations to contiguous locations in the memory circuitry.

6. The apparatus of claim 1, wherein a second one of the tensor operations is a copy operation that includes unaligned boundaries for the tensor data in the memory circuitry.

7. The apparatus of claim 1, wherein a second one of the tensor operations is a copy operation from the buffer circuitry to the memory circuitry, wherein the tensor data is read from matrix elements in the buffer circuitry that are unaligned with matrix elements for the tensor data.

8. A non-transitory computer-readable medium including instructions, which when executed by at least one processor, cause the at least one processor to perform operations, comprising:
   receive a request for at least one machine learning operation including tensor operations from a central processing unit at a data processing unit, wherein a first one of the tensor operations is a copy operation from buffer circuitry to memory circuitry and the copy operation from the buffer circuitry to the memory circuitry is a scatter copy operation to non-contiguous memory locations in the memory circuitry;
   perform at least one operation on tensor data in accordance with the at least one machine learning operation at the data processing unit;
   generate a plurality of sub-commands for the tensor operations at the data processing unit;
   provide the plurality of sub-commands to memory controller circuitry at the data processing unit to perform the tensor operations,
   wherein the plurality of sub-commands include:
      identify addresses in the memory circuitry at the data processing unit to access;
      activate one or more rows in the memory circuitry that correspond to the addresses; and
      transfer the tensor data to and/or from the memory circuitry; and
   transmit machine learning results associated with the performance of the at least one operation on the tensor data to the central processing unit.

9. The non-transitory computer-readable medium of claim 8, wherein the memory circuitry includes a first memory die and a second memory die, wherein a second one of the tensor operations is a copy operation from the first memory die to the second memory die.

10. The non-transitory computer-readable medium of claim 9, wherein the copy operation from the first memory die is a gather copy operation from non-contiguous memory locations in the first memory die to contiguous memory locations in the second memory die.

11. The non-transitory computer-readable medium of claim 8, wherein a second one of the tensor operations is a copy operation from the memory circuitry to the buffer circuitry and the data is gathered from non-contiguous addresses within the memory circuitry to contiguous locations within the buffer circuitry.

12. The non-transitory computer-readable medium of claim 8, wherein a second one of the tensor operations is a convolution copy from the buffer circuitry to the memory circuitry, wherein the convolution copy includes copying the tensor data from non-contiguous buffer locations to contiguous locations in the memory circuitry.

13. The non-transitory computer-readable medium of claim 8, wherein a second one of the tensor operations is a copy operation that includes unaligned boundaries for the tensor data in the memory circuitry.

14. The non-transitory computer-readable medium of claim 8, wherein a second one of the tensor operations is a copy operation from the buffer circuitry to the memory circuitry, wherein the tensor data is read from matrix elements in the buffer circuitry that are unaligned with matrix elements for the tensor data.

15. A system comprising:
a central processing unit; and
a data processing unit communicatively coupled to the central processing unit, comprising:
  memory circuitry to store tensor data representing a tensor;
  memory controller circuitry to access the memory circuitry; and
  processor circuitry to:
    receive a request for at least one machine learning operation including tensor operations from the central processing unit, wherein a first one of the tensor operations is a copy operation from buffer circuitry to the memory circuitry and the copy operation from the buffer circuitry to the memory circuitry is a scatter copy operation to non-contiguous memory locations in the memory circuitry;
    perform at least one operation on the tensor data in accordance with the at least one machine learning operation;
    generate a plurality of sub-commands for the tensor operations;
    provide the sub-commands to the memory controller circuitry to perform the tensor operations;
    wherein the plurality of sub-commands include:
      identify addresses in the memory circuitry to access;
      activate one or more rows in the memory circuitry that correspond to the addresses; and
      transfer tensor data to and/or from the memory circuitry; and
    transmit machine learning results associated with the performance of the at least one operation on the tensor data to the central processing unit.

16. The system of claim 15, wherein the data processing unit is a tensor processing unit to perform neural network processing.

17. The system of claim 15, wherein the memory circuitry includes a first memory die and a second memory die, wherein a second one of the tensor operations is a copy operation from the first memory die to the second memory die.

18. The system of claim 17, wherein the copy operation from the first memory die is a gather copy operation from non-contiguous memory locations in the first memory die to contiguous memory locations in the second memory die.

19. The system of claim 15, wherein a second one of the tensor operations is a copy operation from the memory circuitry to the buffer circuitry and the data is gathered from non-contiguous addresses within the memory circuitry to contiguous locations within the buffer circuitry.

20. The system of claim 15, wherein a second one of the tensor operations is a convolution copy from the buffer circuitry to the memory circuitry, wherein the convolution copy includes copying the tensor data from non-contiguous buffer locations to contiguous locations in the memory circuitry.

21. The system of claim 15, wherein a second one of the tensor operations is a copy operation that includes unaligned boundaries for the tensor data in the memory circuitry.

22. The system of claim 15, wherein a second one of the tensor operations is a copy operation from the buffer circuitry to the memory circuitry, wherein the tensor data is read from matrix elements in the buffer circuitry that are unaligned with matrix elements for the tensor data.

* * * * *